Oct. 19, 1954
J. A. MORTON
2,692,351
ELECTRON BEAM AMPLIFIER
Filed Dec. 31, 1949
7 Sheets-Sheet 1
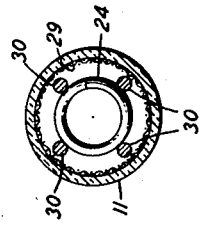
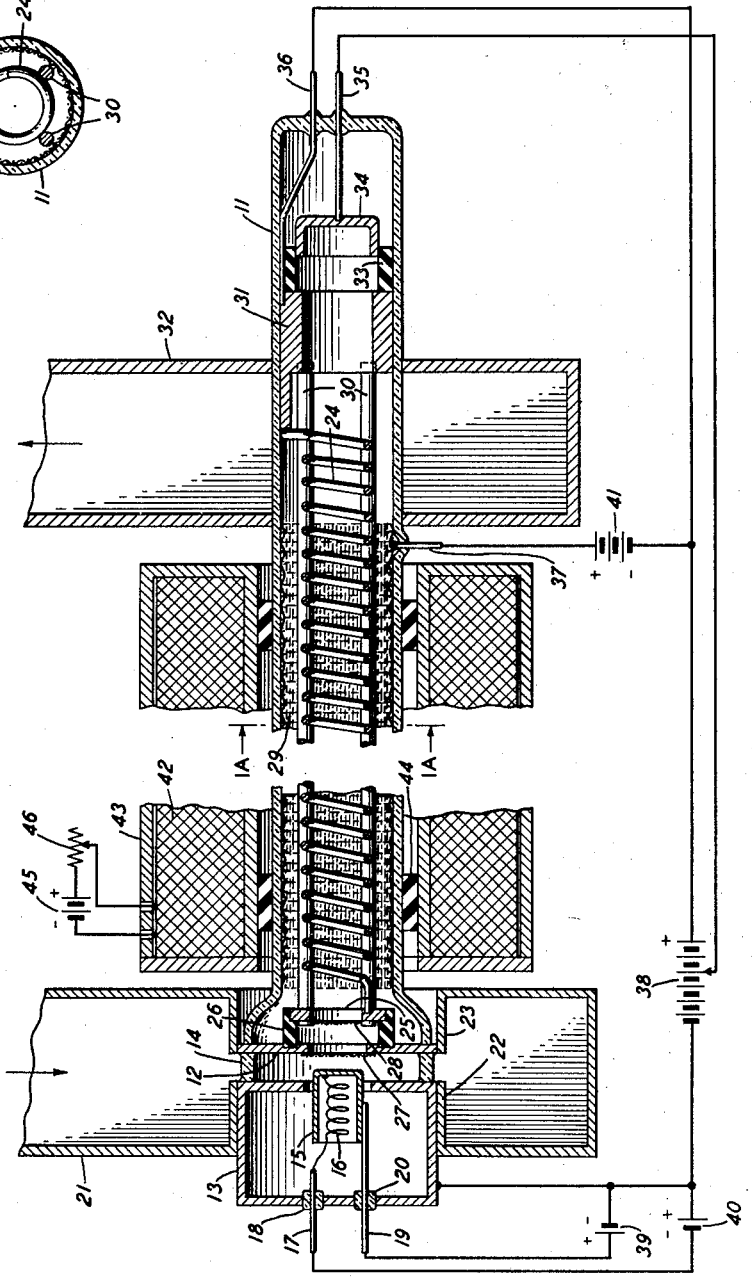
INVENTOR
*J. A. MORTON*
BY
*N. S. Ewing*
ATTORNEY Oct. 19, 1954
J. A. MORTON
2,692,351
ELECTRON BEAM AMPLIFIER
Filed Dec. 31, 1949
7 Sheets-Sheet 3
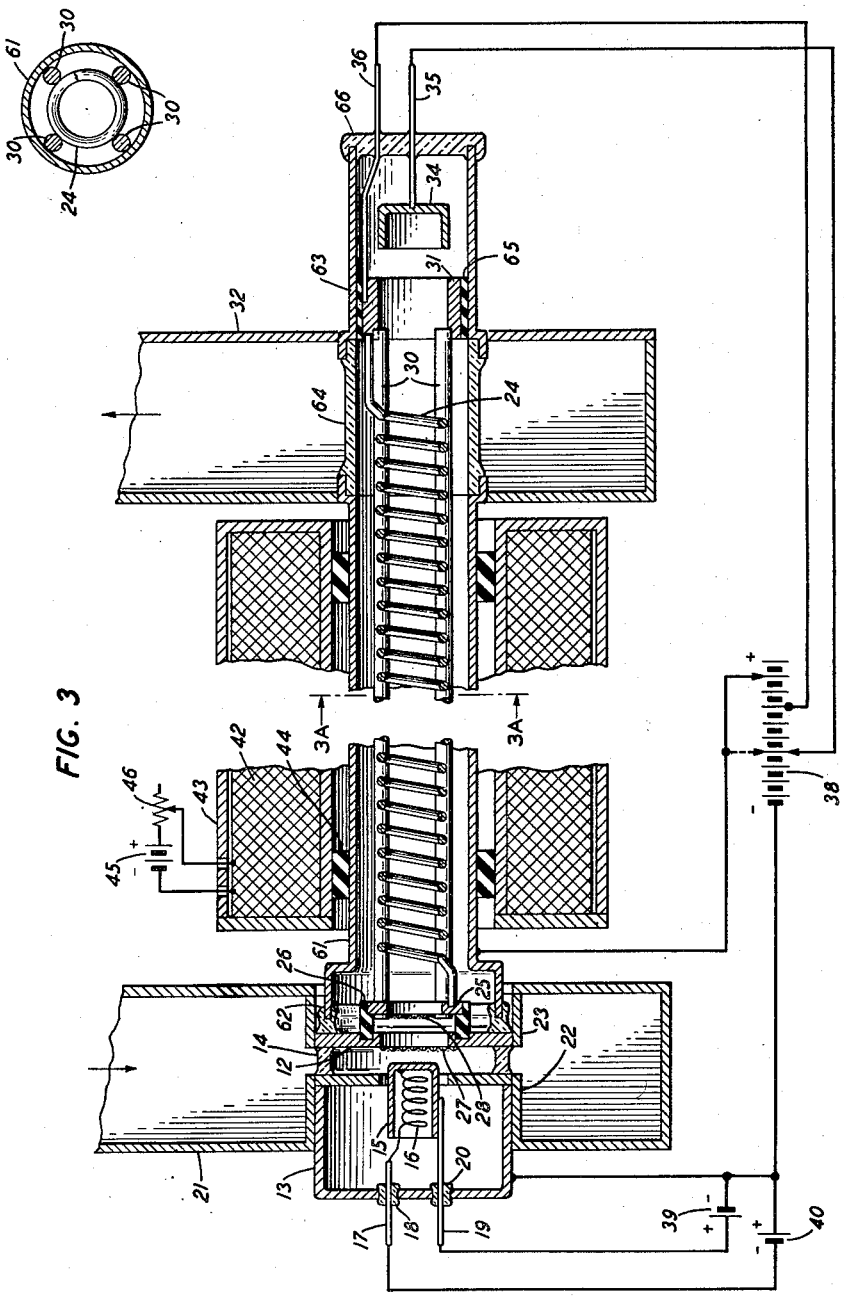
INVENTOR
J. A. MORTON
BY
N. A. Ewing
ATTORNEY

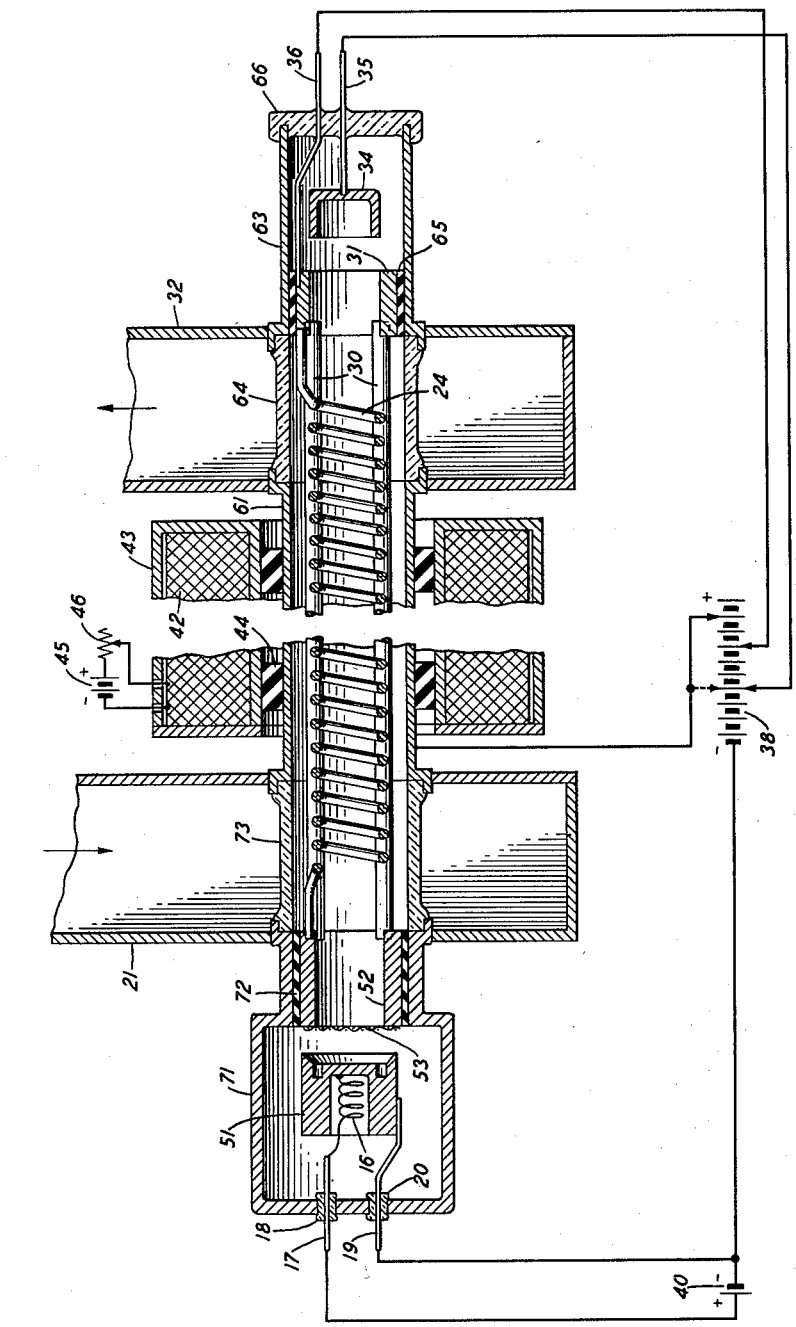

Oct. 19, 1954    J. A. MORTON    2,692,351
ELECTRON BEAM AMPLIFIER
Filed Dec. 31, 1949    7 Sheets-Sheet 5

INVENTOR
J. A. MORTON
BY
N. S. Ewing
ATTORNEY

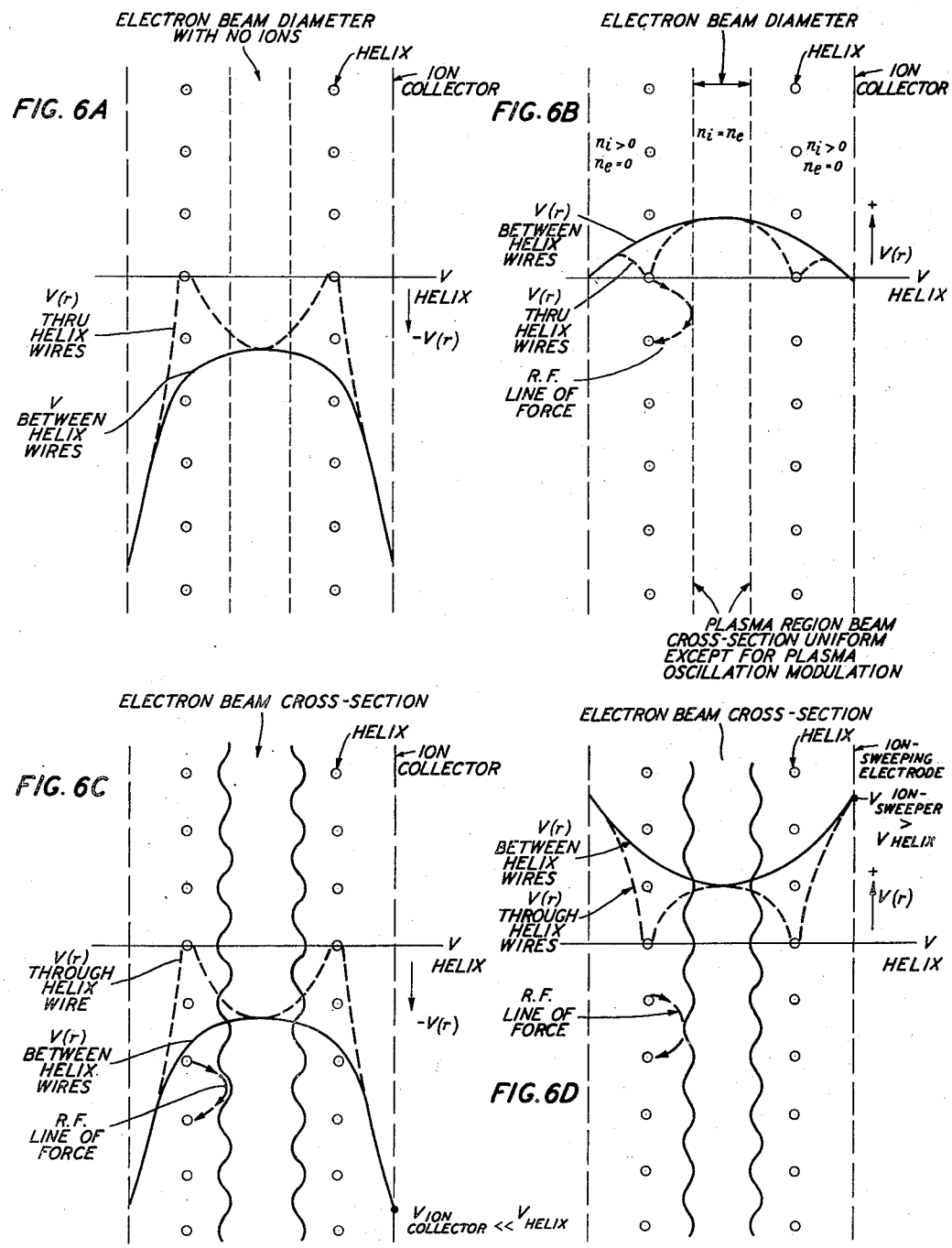

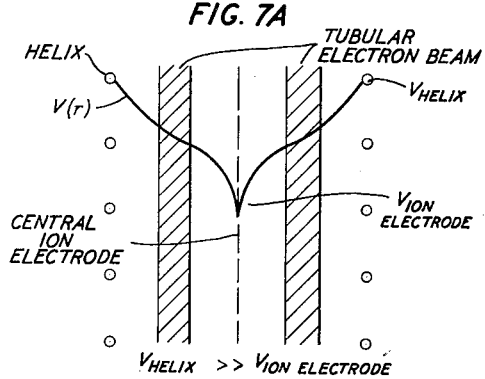
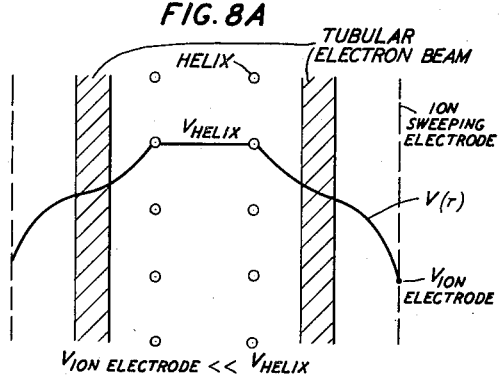
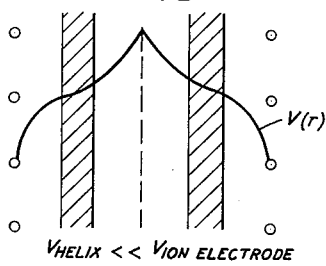
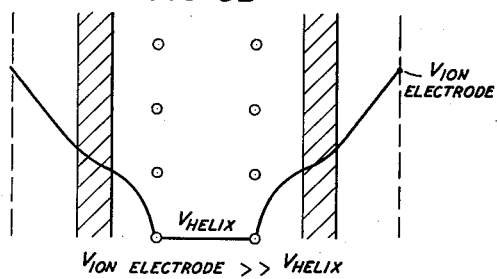
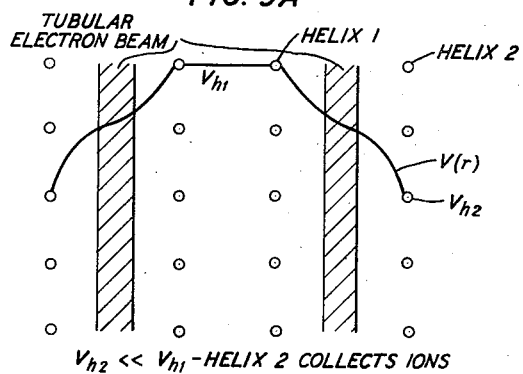
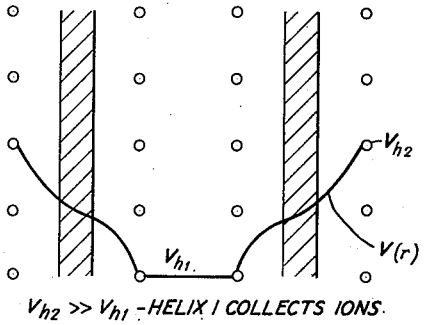

Patented Oct. 19, 1954

2,692,351

UNITED STATES PATENT OFFICE 2,692,351

ELECTRON BEAM AMPLIFIER

Jack A. Morton, Neshanic Station, N. J., assignor to Bell Telephone Laboratories, Incorporated, New York, N. Y., a corporation of New York Application December 31, 1949, Serial No. 136,206

7 Claims. (Cl. 315—3)

This invention relates generally to high-frequency space discharge devices and more particularly to traveling-wave tubes, which utilize the interaction between an electron stream and the electric field components of a traveling electromagnetic wave to secure amplification.

One object of the invention is to reduce the random ion oscillations which tend to be generated in such a device.

A more particular object is to remove extraneous ions from the path of the electron stream at a rate greater than their rate of formation.

A further object is to restrain the electron stream electrostatically by the same means as that used to reduce ion noise.

A typical traveling-wave tube is described in application Serial No. 704,858, filed October 22, 1946, by J. R. Pierce (United States Patent 2,602,148, issued July 1, 1952) and in an article by J. R. Pierce and L. M. Field in volume 35 of the Proceedings of the I. R. E., pages 108 through 111, entitled "Traveling-Wave Tubes." In such devices, an electromagnetic wave is transmitted along an elongated wave transmission circuit which may be, for example, a wire helix. A stream of electrons is directed past the circuit to interact with the electric field components of the traveling electromagnetic wave. The stream may, for example, be directed lengthwise of and within the helix. If the phase velocity component of the wave in the direction of electron travel is substantially equal to the electron velocity, interaction will take place and the electromagnetic wave will increase in amplitude as it progresses along the transmission circuit.

A difficulty which has been encountered in the operation of many traveling-wave tubes has been that of excessive noise modulation. The noise has the effect of reducing the signal-to-noise modulation ratio of the tube and of distorting the electromagnetic wave as it is being amplified. Much of this noise modulation, as will be explained later, is believed to be caused by random ion oscillations occurring in a plasma formed along the electron stream.

In accordance with a feature of the present invention, there is provided within a traveling-wave tube a direct-current electric field with strong components transverse to the direction of electron flow. In a tube utilizing a helix as a wave transmission circuit, for example, the field may be radial. The transverse field components tend to remove the noise-producing ions at a rate greater than their rate of production and noise modulation is accordingly reduced.

In accordance with another feature of the invention, the helix forming the wave transmission circuit of a traveling-wave tube is surrounded by a conducting shield which is maintained at a direct-current potential substantially positive with respect to that of the helix. The shield may, for example, be a hollow cylindrical member located between the helix and a non-conducting envelope, or it may be a portion of the envelope itself. The potential difference between the shield and the helix establishes the radial electric field and extraneous ions tend to be removed from the electron path. At the same time, the electron stream itself, which is within the confines of the helix, is constrained by the effect of the field, as will be subsequently related.

In accordance with still another feature of the present invention, a slidable coupling trimmer surrounds the envelope of a traveling-wave tube within the input or output wave guides in order to provide adjustable coupling between the radio frequency input signal and the wave transmission circuit of the tube. The trimmer permits the ion removal shield of the tube to be extended over a greater length of the interaction path and its effectiveness is thereby increased.

A more thorough understanding of the nature and objects of the invention may be obtained by a study of the following detailed description and discussion of several specific embodiments. In the drawings:

Fig. 1 is a longitudinal cross-section of a traveling-wave tube having a triode-type input circuit and a gauze ion shield situated between the helix and the glass envelope of the tube;

Fig. 1A is a transverse cross-section of the tube shown in Fig. 1, taken along the line 1A—1A;

Fig. 3 is a longitudinal cross-section of a traveling-wave tube with a triode input circuit and a metal envelope;

Fig. 3A is a transverse cross-section of the tube shown in Fig. 3, taken along the line 3A—3A;

Fig. 4 is a longitudinal cross-section of a traveling-wave tube in which the input signal is impressed directly on the helix and which has a metal envelope;

Figs. 6A, 6B, 6C and 6D are diagrams showing potential distributions along the radius of a traveling-wave tube when an ion shield surrounds the helix;

Figs. 7A and 7B show potential distributions when a central ion-removing electrode is located within a hollow electron stream;

Figs. 8A and 8B show potential distributions when a hollow electron stream is directed between the helix and an outer ion shield; and Figs. 9A and 9B show potential distributions when a hollow electron stream is directed between two concentric helices.

Figure 2:
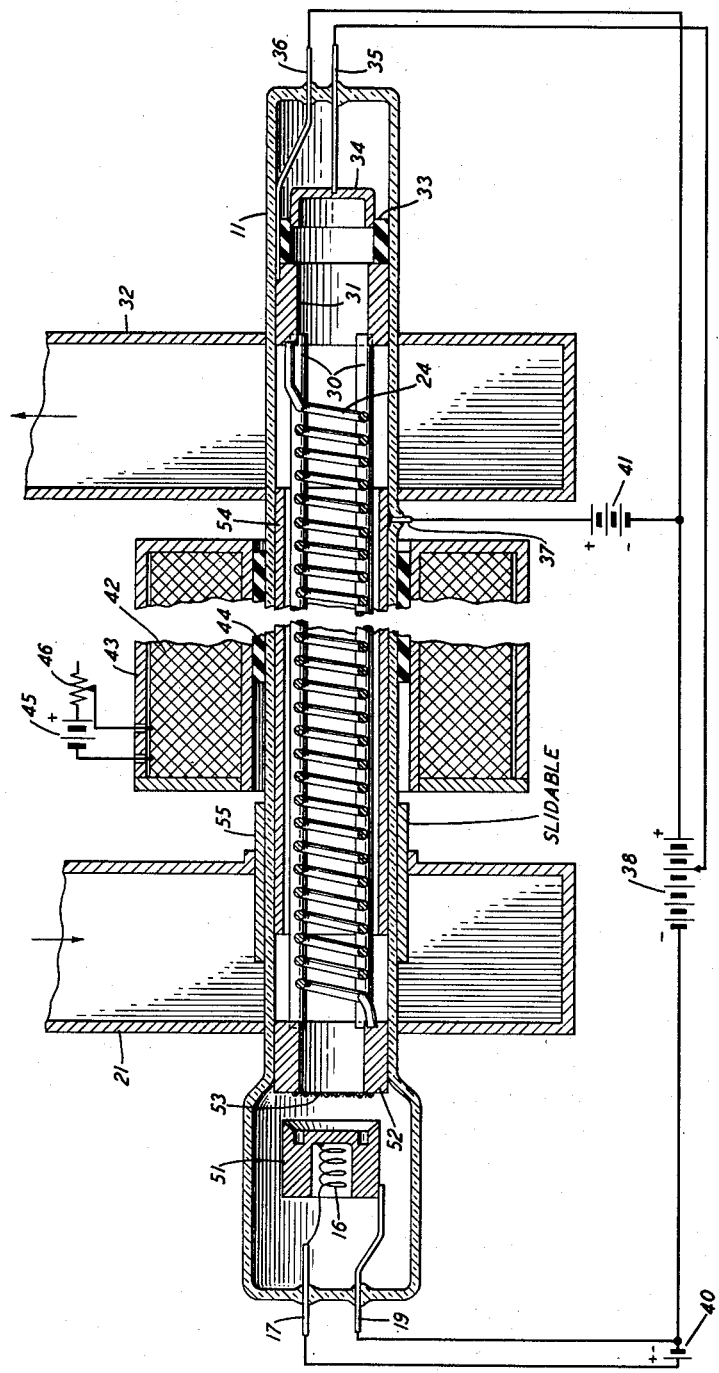
Fig. 2 is a longitudinal cross-section of a traveling-wave tube in which the input signal is impressed directly on the helix and which has a solid ion shield situated between the helix and the glass envelope of the tube.

When a traveling-wave tube of the type shown in the previously-mentioned application by J. R. Pierce is fed from a single frequency generator, and its output is viewed with a spectrum analyzer, it is found that sidebands of a fairly discrete nature which are fluctuating in amplitude and frequency exist on each side of the signal response. With a main signal frequency, for example, four thousand megacycles, the average amplitude of these spurious sidebands may vary from the order of ten decibels down from the main signal to fifty or sixty decibels down. In general, the amplitude falls off as a function of the frequency interval away from the main signal. The amplitudes are generally maximum within several megacycles of the main signal, but some spurious side bands of smaller magnitude have been found as far away as thirty megacycles.

These spurious sidebands are not present in the output of a traveling-wave tube when the signal is not supplied. For instance, with the signal off, the plot of output noise in the four thousand megacycle range is flat with frequency and the noise is about one hundred and forty decibels below one milliwatt per unit frequency interval, which is about what is to be expected assuming pure shot noise fluctuations in the electron stream. Thus, the spurious effect is a fluctuating but fairly discrete modulation of the high frequency gain of the tube.

If the collector current from such a tube is examined with a low frequency spectrum analyzer in the range from zero to thirty megacycles, spurious signals are observed which may be correlated with the fluctuating sidebands on the radio frequency signal. It is found that the spurious signals depend upon the gas pressure in the tube, the electron stream current density, the mass of the gas ions in the tube, and the strength of a magnetic focusing field. It is believed that these fluctuating but rather discrete spurious signals which are present in the electron stream are caused by ion oscillations in plasma formed along the electron beam. Oscillations of this type are discussed in detail in an article by L. Tonks and I. Langmuir in volume 33, second series, of The Physical Review, pages 195 through 210, entitled "Oscillations in Ionized Gases," and in an article by J. R. Pierce in volume 19 of The Journal of Applied Physics, pages 231 through 236, entitled "Possible Fluctuations in Electron Streams Due to Ions."

Briefly, molecules of gas left in the tube after evacuation or subsequently liberated from the parts by electron bombardment and heating, drift into the region of the electron beam where they are ionized. These ions are trapped along the beam in the depressed potential along the beam caused by electron space charge, especially in the deep potential pockets caused by intense space charge in the region of beam crossovers produced by a convergent gun and a magnetic focusing field. If there are enough gas molecules in the tube the beam will eventually become a plasma in which the densities of positive ions and electrons are equal. If sustained, such a medium is capable of supporting oscillations of the gas ions if they are initially perturbed. These oscillations appear as fluctuating signals in the collector current as observed and, by varying the convection current and cross section of the electron beam (and hence its coupling to the traveling wave), succeed in similarly modulating the high frequency amplification of the signal as described.

In accordance with a feature of the present invention, as has been previously noted, traveling-wave tubes are provided with direct-current electric fields having strong components transverse to the direction of flow of electrons (that is, a radial direction). Ions are thereby removed at a rate greater than their rate of production, thus preventing the formation of a plasma and the subsequent generation of spurious modulation of the high frequency signal.

The rate of ion formation may also be reduced by appropriate selection of tube materials, processing for the various electrodes, and determination of their operating voltages and currents. A number of such ion reduction schemes will be discussed in due course.

Figs. 1, 2, 3, and 4 all illustrate traveling-wave tubes which, in accordance with the present invention, are provided with strong radial direct-current electric fields which tend to remove positive ions from the electron path. Referring particularly to Fig. 1, the tube shown employs a triode-type input circuit and a gauze ion shield. The interaction path of the tube is enclosed within an evacuated elongated glass envelope 11. Envelope 11 is a hollow cylindrical member, open and somewhat increased in diameter at its left end and closed at its right end. The right end of envelope 11 is closed by a flat conducting plate 12, which is sealed to envelope 11 and has a circular central aperture which is aligned with the axis of envelope 11. End-plate 12 is preferably of some non-magnetic metal such as copper.

To the left of end-plate 12 is a short, hollow metal cathode housing cylinder 13, which is axially aligned with envelope 11 and closed at both ends. The right end of cylinder has a central aperture which is aligned with the aperture in end-plate 12. Cylinder 13 is of substantially the same diameter as the left end of glass envelope 11 and is separated from end-plate 12 by a glass ring 14. Glass ring 14 has substantially the same diameter as the left end of glass envelope 11 and is sealed between cathode housing cylinder 13 and end-plate 12.

An electron-emissive cathode 15 is situated partially within cylinder 13 and extends somewhat through the aperture in the right end-portion of cylinder 13. Cathode 15 comprises a short metal cylinder which is open at its left end and closed at the right. The right face of cathode 15 is coated with electron emissive material and a heating coil 16 is located within the hollow portion of the cathode cylinder. One end of heater 16 is connected directly to the cathode cylinder, while the other end is connected to a short conducting rod 17 which is brought out through the left face of cylinder 13 through a glass seal 18. Cathode 15 is supported by a short conducting rod 19, which is connected to it and which extends through the left face of cylinder 13 through a glass seal 20.

A radio frequency signal input wave guide 21 surrounds the right portion of cylinder 13 and the left end of glass envelope 11. Wave guide 21 is of the rectangular type and is closed at one end. The tube extends through the guide 21 at a point substantially a quarter of a wavelength from the closed end, with the tube axis normal to the broad faces of the guide 21. Where the tube passes through the guide 21, a pair of annular flanges 22 and 23 extend inward from either face of the guide, flush with the outermost surface of cylinder 13 and with the circular edge of the end-plate 12, respectively. At their farthest extent into wave guide 21, the ends of flanges 22 and 23 are flush with the right face of cylinder 13 and the left face of end-plate 12, respectively.

An elongated wire helix 24 extends for most of the length of glass envelope 11, and its left end is supported by a structure in the enlarged portion at the left end of the glass envelope 11. A conducting annular member 25 is situated to the right of end-plate 12 and its central aperture is aligned with the aperture in end-plate 12. Member 25 is supported by a non-conducting ring 26 which is, in turn, attached to end-plate 12. The left end of helix 24 is attached to member 25 and a pair of grids 27 and 28 cover the apertures in end-plate 12 and member 25, respectively.

A gauze ion shield 29 surrounds helix 24 throughout most of its length. Shield 29 is in the form of a hollow cylinder and is flush against the inner surface of glass envelope 11, extending from a point just to the right of supporting member 25 to a point somewhat short of the right end of helix 24. Shield 29 is in the form of a wire gauze or screen in the embodiment of the invention illustrated in Fig. 1. Alternatively, it may be in the form of a perforated conducting tube or, as will be subsequently shown, it may merely be a solid metal tube.

Helix 24 is held in place and spaced from ion shield 29 by a number of non-conducting rods 30 (four, for example) which are spaced about the exterior of helix 24 and which extend lengthwise within the tube. Fig. 1A is a transverse cross-section of an intermediate portion of the tube showing the relative positions of glass envelope 11, ion shield 29, supporting rods 30, and helix 24.

The left ends of rods 30 extend through holes in supporting member 25, while the right ends extend into slots in a short conducting cylinder 31. Cylinder 31 is situated a short distance from the right end of glass envelope 11 and its outer surface is flush with the inner surface of envelope 11. Cylinder 31 has a circular central aperture which is aligned with the apertures in supporting member 25 and in end-plate 12 at the other end of the tube.

A signal output wave guide 32 surrounds the right end portion of envelope 11 at a point just to the right of cylinder 31. Wave guide 32 is rectangular and is closed at one end. Envelope 11 passes through the guide 32 at a point substantially a quarter of a wavelength from the closed end, with the axis of envelope 11 normal to the broad faces of the guide 32. The inner surface of the right wall of guide 32 is flush with the left end of a cylinder 31. Ion shield 29 ends at the left wall of output guide 32.

At the point farthest away from the closed end of wave guide 32, a partial continuation of cylinder 31 extends half-way into the guide 32 to form an antenna, and the right end of helix 24 extends to the left end of the extended portion and is attached to it.

To the right of cylinder 31, a non-conducting ring 33 holds a cup-shaped collector electrode 34 in place. Collector 34 is faced toward cathode 15 and is aligned with the apertures in end-plate 12, supporting member 25, and cylinder 31. A conducting rod 35 is attached to collector 34 and is sealed out through the right end of glass envelope 11. A somewhat similar conducting rod 36 is attached to cylinder 31 and, after passing through a small aperture in non-conducting ring 33, is also sealed out through the right end of envelope 11.

Near the right end of ion shield 29, a short conducting rod 37 is attached to the shield 29 and is sealed out through the wall of glass envelope 11.

Direct operating potentials are applied to the tube from a number of direct voltage sources which may be, for example, batteries. In Fig. 1, the negative terminal of the main electron beam accelerating battery 38 is connected directly to end-cylinder 13. Cathode 15 is held at a potential slightly positive with respect to the surrounding cylinder 13 by means of a battery 39, which is connected between rod 19 and the negative terminal of battery 38. Heating current is supplied to coil 16 by a battery 40, the negative side of which is connected to rod 17 and the positive side of which is connected to the negative pole of main battery 38. The most positive point of battery 38 is connected to rod 36 and a slightly less positive intermediate point is connected to rod 35. An auxiliary battery 41 is connected between rod 37 and the most positive point of battery 38, with its positive pole connected to rod 37.

A magnetic focusing coil 42 surrounds envelope 11 between wave guides 21 and 32. A non-magnetic shield 43 encloses coil 42, with the whole assembly 42—43 being in the form of a hollow cylinder which is concentric with envelope 11 and which has an inside diameter somewhat greater than the outside diameter of envelope 11. Shield 43 may be held apart from envelope 11 by one or more ceramic rings 44. Focusing coil 42 is supplied with direct current by a battery 45, and the strength of the field may be controlled by a potentiometer 46, which is connected to control the current flowing from battery 45.

When the tube shown in Fig. 1 is energized, an electron stream is projected along the axis of the tube from cathode 15 to collector 34. The electrons are maintained in a uniform beam by the effect of the longitudinal magnetic field set up by focusing coil 42. The stream convection current is modulated by the input signal as it passes grid 27, and as the stream enters the region within helix 24 the variations cause a radio frequency wave corresponding to the input signal to be impressed upon the helix 24. The signal wave travels along helix 24 with a longitudinal phase velocity component substantially equal to the average electron velocity, and interaction between the stream and the longitudinal electric field components of the wave causes the wave to grow in amplitude until it reaches the right end of helix 24. At that point the antenna formed by the extension of cylinder 31 is energized and the amplified radio frequency signal wave is taken off through output wave guide 32.

Ordinarily, as has been discussed previously, a tube such as that described in connection with Fig. 1 would be subject to random ion oscillations. However, in accordance with a feature of the present invention, ion shield 29 helps provide a strong direct-current electric field which is transverse to the direction of electron flow (that is, radial). Shield 29 is maintained highly positive with respect to helix 24 by battery 41, and the resulting field causes positive ions to be swept from the stream path onto the wires of helix 24. A more detailed exposition of the process of ion removal will be presented later.

Fig. 2 illustrates another traveling-wave tube which, in accordance with the present invention, is provided with a strong radial direct-current electric field for ion removal purposes. With one important modification which will be discussed in due course, the tube shown in Fig. 2 possesses a type of radio frequency signal input circuit which may, at the present stage of development of the traveling-wave tube art, be referred to as a conventional input circuit. In other words, the signal wave is impressed directly on the helical wave transmission structure rather than indirectly as in Fig. 1.

In Fig. 2, parts which are substantially the same as corresponding parts in the tube of Fig. 1 have been given the same reference numbers as the corresponding parts and will not be described again in detail. As in Fig. 1, an elongated glass envelope 11 houses most of the gain-producing components of the tube. Here, envelope 11 is evacuated and closed at both ends, but its left end portion is enlarged somewhat inasmuch as it houses the electron gun structure. A cylindrical cathode 51 is located in the enlarged left end portion of envelope 11 and is axially aligned with the rest of the tube, with its electron-emissive surface facing to the right. By way of example, cathode 51 is shown with an annular depression surrounding its emissive surface and with an annular portion surrounding the depression and extending somewhat beyond the emitting surface to shield the stream.

The left portion of cathode 51 has a hollow space to receive a heating coil 16, one end of which is attached to the cathode 51. As in Fig. 1, the cathode 51 is supported by rod 19 and the other end of heater 17 is connected to rod 17. Both rods 17 and 19 are sealed out through the left end of glass envelope 11.

As in Fig. 1, an elongated wire helix 24 extends for most of the length of envelope 11. At the left end of the helix 24 is a short, hollow conducting cylinder 52, the left end of which is spaced apart from the right end of cathode 51. The central aperture of cylinder 52 is aligned with the emitting surface of cathode 51 and is of substantially the same diameter as helix 24. The outside surface of cylinder 52 fits snugly against the inside surface of glass envelope 11 and the extreme left end of helix 24 is embedded in the right end of cylinder 52. A beam collimating grid 53 covers the left end of the central aperture in the cylinder 52.

The right end of the tube is substantially the same as the right end of the tube in Fig. 1. A short, hollow conducting cylinder 31 fits snugly within envelope 11 with its central apertures aligned with the central aperture in cylinder 52. A non-conducting ring 33 which may be, for example, ceramic supports collector 34 to the right of cylinder 31. A rod 36 is embedded in cylinder 31 and is brought out through the right end of the envelope 11. Similarly, a rod 35 is embedded in collector electrode 34 and is sealed out through the right end of envelope 11.

Envelope 11 extends through a rectangular radio frequency signal input wave guide 21 at a point just to the right of cylinder 52. The inside face of the left wall of the guide 21 is flush with the right end of cylinder 52. Similarly, envelope 11 extends through a rectangular output wave guide 32 just to the left of cylinder 31. The inside face of the right wall of the guide 32 is flush with the left end of cylinder 31.

Helix 24 continues with a constant pitch throughout its length. It extends all the way through input wave guide 21, but only substantially half way into output wave guide 32. From that point, a straightened continuation of the helix wire extends longitudinally of the tube to and is embedded in end-cylinder 31. The straightened portion of helix wire corresponds to and performs the antenna function of the extension of cylinder 31 shown in Fig. 1. The arrangements may be used alternatively.

A hollow conducting cylinder 54 forms an ion shield and surrounds helix 24 between the input and output guides 21 and 32. Ion shield 54 may be of solid non-magnetic conducting material with appreciable thickness as shown, or may be of metal foil. It is concentric with helix 24 and is situated between helix 24 and envelope 11, extending from the central portion of input guide 21 to the left wall of output guide 32. As in Fig. 1, four spaced non-conducting rods 30, which may be, for example, ceramic, separate helix 24 from the inside surface of ion shield 54. To the left of output guide 34, a conducting rod 37 is attached to shield 54 and extends out through the wall of envelope 11.

The main beam focusing arrangement shown in Fig. 2 is the same as that described in connection with Fig. 1. The negative terminal of main battery 38 is connected to rod 19, while the most positive terminal of battery 38 is, as in Fig. 1, connected to rod 36. Rod 35 is coupled to an intermediate point on battery 38, while auxiliary battery 41 is connected with its positive pole attached to rod 37 and its negative pole joined to the most positive pole of battery 38. Heater battery 40 is connected between rods 17 and 19.

The operation of the Fig. 2 tube is substantially the same as that of the one disclosed in the previously-mentioned J. R. Pierce application. When the tube is energized, a stream of electrons is projected lengthwise of and within helix 24, from cathode 51 to collector 34. A radio frequency signal wave carried by input guide 21 is impressed upon helix 24 and it travels to the right along the helix 24. The traveling wave is amplified by interaction with the stream and it is taken off through output guide 32.

A novel trimming adjustment is employed in connection with input wave guide 21 in Fig. 2 which may be utilized to advantage in connection with the output guide 32 if desired or in other tubes. It is here shown in connection with input guide 21 by way of example. A conducting tubular member 55 surrounds envelope 11 at the point where guide 21 couples to helix 24. The inside surface of trimmer 55 fits snugly but slidably against the outer surface of envelope 11 and its outside surface is against the right wall of the guide 21 where the tube passes through it. The length of trimmer 55 is somewhat greater than the width of the guide 21 and space is left between envelope 11 and focusing coil shield 43 to accommodate it at the left end of shield 23.

Trimmer 55 may be moved either left or right along the outside of envelope 11 to change the coupling between guide 21 and helix 24. As trimmer 55 is moved to the left, fewer and fewer turns of helix 24 are exposed to the input wave in guide 21 and coupling is reduced. Moving trimmer 55 to the right, on the other hand, increases the coupling.

Since trimmer 55 extends into the interior of input guide 21, ion shield 54 is extended farther to the left than it would be in the absence of such an arrangement. Ions are thereby removed from the electron stream in the region within guide 21 as well as elsewhere along the interaction path.

As was noted previously, the operation of a tube of this type is often hampered by ion oscillations. The strong radial direct-current electric field which, in accordance with the present invention, is set up by ion shield 54 and helix 24 tends to remove positive ions and thereby prevent ion noise. As in Fig. 1, shield 54 is highly positive with respect to helix 24 and ions are collected on the helix 24. As was indicated in connection with Fig. 1, a detailed discussion of the ion removal process will appear later.

Ion shield 29 of Fig. 1 and ion shield 54 of Fig. 2, it will be noted, may be used interchangeably. They are shown in connection with the respective figures only by way of example.

Fig. 3 shows still another traveling-wave tube which is provided with a strong radial electric field for the purpose of ion removal in accordance with the present invention. The tube shown is much the same as the tube of Fig. 1, except that it employs a metal envelope 61 which is held at a direct-current potential substantially different from that of the wave transmission helix 24.

Referring particularly to Fig. 3, the interaction path is housed in an elongated metal envelope 61. Envelope 61 is non-magnetic and may be, for example, copper, molybdenum, or tantalum. Envelope 61 is open at both ends and is of somewhat greater diameter at its left end where it is joined to the structure housing the electron gun.

The gun and gun-housing structures to the left of and including end-plate 12 are substantially identical to that shown in Fig. 1 and will not be redescribed. The signal input wave guide 21 is also the same and is similarly attached. End-plate 12 is attached to the left end of envelope 61 by means of an annular glass seal 62.

The right end of envelope 61 fits into a circular aperture in the letf wall of the output wave guide 32. As before, the tube axis is normal to the face of wave guide 32 and is substantially a quarter of a wavelength from the closed end of the guide 32. A short extension 63 of envelope 61 is aligned with envelope 61 and fits into a circular aperture in the right wall of wave guide 32. A glass or ceramic coupling window 64 is sealed between envelope 61 and envelope extension 63 within output guide 32, enabling the tube to be evacuated. Window 64 is in the form of a short hollow cylinder which has inside and outside diameters approximately equal to the corresponding dimensions of envelope 61 and envelope extension 63.

A short metal cylinder 31 is located within and concentric with envelope extension 63 with its left end flush with the inner surface of the right wall of output wave guide 32. Cylinder has a central aperture which is aligned with and has substantially the same dimensions as the aperture in end-plate 12 at the other end of the tube. Cylinder 31 is, however, insulated from envelop extension 63 by a non-conducting ring 65 which surrounds its outer surface and is situated between it and the inner surface of envelope extension 63.

A glass seal 66 closes the right end of envelope extension 61. A collector electrode 34 is located to the right of cylinder 31 and is aligned with the aperture in the cylinder 31. The conducting rod 35 which supports collector 34 passes through glass seal 66. Similarly, a conducting rod 36 is brought from cylinder 31 out through glass seal 66.

The helix assembly in Fig. 3 is the same as that in Fig. 1 except that an antenna of the type used in Fig. 2 is formed from the right end of helix 24 to couple helix 24 to output wave guide 32. Helix 24 is spaced from metal envelope 61 by a number (four for example) of ceramic rods 30 spaced about its periphery. Details may be seen in Fig. 3A, which is a transverse cross section of the tube taken along the line 3A—3A. The supporting structure for the left end of helix 24 and rods 30 is the same as shown in Fig. 1 and will not be described again.

A magnetic beam focusing coil 42 is also provided for the tube shown in Fig. 3. It is supported and supplied with current in the same manner as are the focusing coils 42 in Figs. 1 and 2.

The battery connections in Fig. 3 are the same as those in Fig. 1 except that auxiliary battery 41 is omitted. Metal envelope 61 may be connected to either a point on main battery 38 substantially positive with respect to the point to which rod 36 is connected or a point substantially negative with respect to the point to which rod 36 is connected.

The operation of the amplifier shown in Fig. 3 is substantially the same as that of the Fig. 1 tube. It has the added advantage, however, of an ion removal system which is an integral, rather than added, part of the tube. In accordance with the present invention, a strong radial direct-current electric field is provided which tends to remove noise-producing positive ions from the path of the electron stream.

Metal envelope 61 may, it will be noted, be either positive or negative with respect to helix 24. As will be explained later, positive ions will be swept onto the helix wires when envelope 61 is positive and will be collected on the inner surface of the envelope 61 when the latter element is negative.

The metal envelope tube shown in Fig. 3 has several advantages over the glass enclosed amplifier of Fig. 1. In the first place, a metal structure is more rugged and less susceptible of breakage. In the second place, the structure of Fig. 3 is somewhat simpler. As will be seen from the cross sectional views in Figs. 1A and 3A, the metal tube structure involves fewer major parts. A third advantage is that the all metal amplifier of Fig. 3 provides more shielding for the interaction path than does a corresponding glass enclosed device. The metal tube will, therefore, be less easily disturbed by stray electric fields which might otherwise cause difficulty.

Finally, gas can be removed from a metal tube more readily than it can be removed from a glass tube since a metal tube can be heated to higher temperatures. If there are fewer gas particles in a tube, ion noise modulation is reduced since ions are formed at a lower rate.

Fig. 4 shows still a fourth traveling-wave tube which, in accordance with the present invention, provides a strong radial direct-current electric field to remove noise-producing positive ions from the path of the electron stream. In essence, the Fig. 4 tube is the tube shown in Fig. 2 with the metal structure of the Fig. 3 tube incorporated into it.

The right half of the tube shown in Fig. 4 is substantially the same as the right half of the Fig. 3 tube and will not be redescribed. Corresponding parts in the two tubes have been given like reference numerals.

The left end of metal envelope 61 in Fig. 4 is substantially the same as the right end and extends into a circular aperture in the right wall of input wave guide 21. An extension 71 of envelope 61 which is located to the left of wave guide 21 houses the gun structure and extends into a circular aperture in the left wall of input guide 21. Where it fits into input guide 21, envelope extension 71 is of the same diameter as envelope 61. The left portion of envelope extension 71 is enlarged somewhat to accommodae cathode 51 and the left end of the extension 71 is closed.

A hollow metal cylinder 52, corresponding to cylinder 31 at the other end of the tube, holds helix support rods 30 in position and is situated within envelope extension 71 with its right end flush with the inside surface of the left wall of wave guide 21. Cylinder 53 is concentric with envelope extension 71 and has a central aperture aligned with cathode 51 and collector 34. A ceramic ring 72 separates cylinder 52 from envelope extension 71, and a collimating grid 53 covers the left end of the central aperture in cylinder 52.

A glass or ceramic coupling window 73 is similar to coupling window 64 at the other end of the tube and is sealed between envelope 61 and envelope extension 71 within input wave guide 21, enabling the tube to be evacuated. The left ends of helix support rods 30 extend into slots in the right end of cylinder 52. The input end of helix 24 is substantially the same as the output end. Helix 24 extends into wave guide 21 from the right to substantially the center of the guide 21. From that point, a straightened extension of the helix wire extends as an antenna to and is embedded in the right end of cylinder 52. The main beam focusing arrangement is the same as described in connection with the previous embodiments of the invention.

Heating current is supplied to heating coil 16 by a battery 40 connected between rods 17 and 19. A main beam accelerating battery 38 is connected with its negative pole to rod 19. Rods 35 and 36 are connected to positive points on battery 38, with rod 36, which determines the potential of helix 24, more positive than rod 35, which determines the potential of collector 34. Metal envelope 61 is connected to a point on battery 38 which may be either substantially positive or substantially negative wtih respect to the potential of helix 24.

The operation of the tube shown in Fig. 4 is substantially the same as that of the tube shown in Fig. 2. The Fig. 4 tube is, however, equipped with a metal envelope 61 which, as noted previously, has the advantage of being an ion removal system which is an integral, rather than an added, tube component. In accordance with the present invention, a direct-current electric field is provided which has strong radial components which tend to remove extraneous positive ions from the electron path.

Since metal envelope 61 may be either substantially positive or substantially negative with respect to helix 24, ions will be collected either on the helix 24 or on the inside of the envelope 61, depending upon the potential of envelope 61. The details of the ion sweeping action will be presented later.

As was stated in connection with Fig. 3, a tube such as that shown in Fig. 4, has several advantages over glass enclosed tubes. A metal tube is usually more rugged and less susceptible of breakage than a glass enclosed tube and its structure is often somewhat simpler. In addition, greater shielding from outside disturbances is provided by the metallic enclosure and more gas particles can be removed during the outgassing process.

Figure 5A:
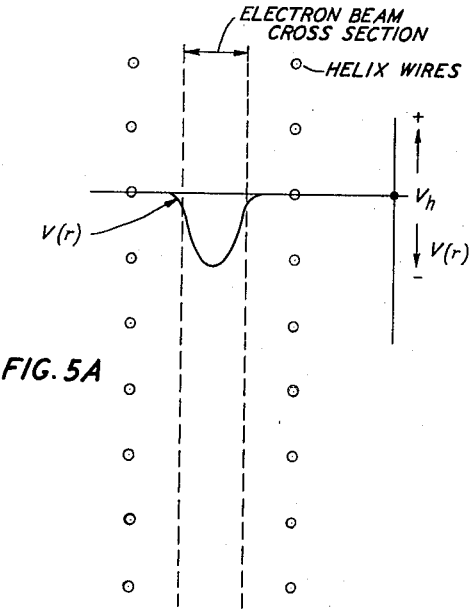
Figs. 5A, 5B and 5C are diagrams showing potential distributions along the radius of a traveling-wave tube under different conditions of ionization.
Figure 5B:
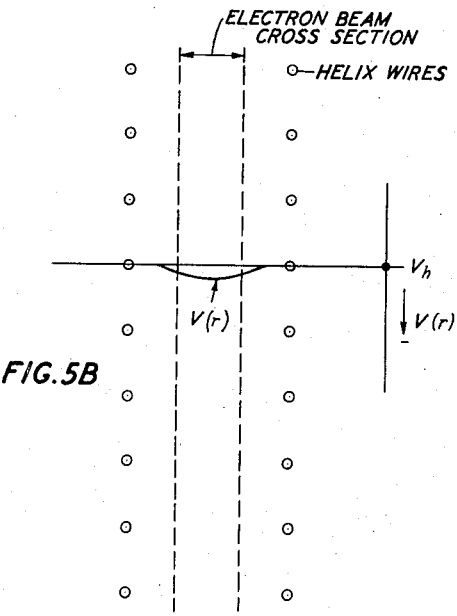
Figure 5C:
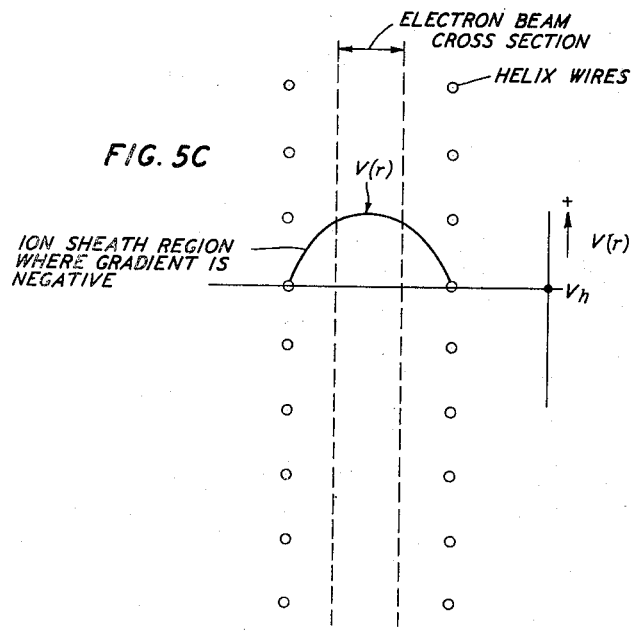

It has been mentioned that positive ions produced by ionization of the residual gas molecules in a traveling-wave tube become trapped in the electron beam and form a plasma capable of generating spurious oscillations which modulate the high-frequency gain of the device. Figs. 5A, 5B, 5C show curves of potential distribution within a traveling-wave tube for different ionization conditions superimposed upon diagrams showing the relative positions of the electron beam and the helix. $V(r)$ shows the potential distribution along the radius of the tube, using the potential of the helix $V_h$ as a reference.

Referring now to Fig. 5A, the potential distribution along the radius of the tube is shown for the condition where no ions have yet formed and a potential trough is produced along the beam due to the negative space charge of the electron beam. As ions are formed along the beam they are trapped in this trough and some of the space charge is neutralized so that the potential distribution is modified as shown in Fig. 5B. Fig. 5B, in other words, shows the potential distribution along the radius of the tube when the ion trap is partially filled. Some ions are lost by diffusion to the helix wires and outside envelope even for the condition shown in Fig. 5B, where there is yet an electric gradient forcing the ions inward. This is, however, a relatively small rate so that, in general, ions will continue to be accumulated along the beam until a situation such as is shown in Fig. 5C comes about. Under these conditions, a plasma exists in the vicinity of the beam, as evidenced by the flat potential distribution near the center of the beam, and equilibrium is established at a potential distribution for which the rate of ion production just equals the rate at which ions are swept out through the ion sheath where the potential gradient is negative. The latter ions recombine on the helix or envelope or any convenient material surface.

One other basic condition must, in general, be satisfied for any equilibrium to become established. That is the condition of energy balance in which energy is added to the plasma by the electron beam at a rate equal to the rate at which energy is lost by exciting or ionizing collisions. This bears such a relationship to the acceleration voltage and the electron current density of the beam that below certain power levels a plasma cannot be formed and remain in existence.

According to Tonks and Langmuir, such a plasma medium is capable of supporting oscillations of the ions at frequencies of the order of or related to $$\nu = \sqrt{\frac{ne^2}{\pi m_p}} = 8980\sqrt{n\frac{m_e}{m_p}}$$

where $\nu$ is the frequency in cycles per second, $n$ is the ion density in ions per cubic centimeter, $e$ is the charge on an electron in coulombs, $m_e$ is the mass of an electron in grams, and $m_p$ is the mass per ion in grams.

It is believed that these plasma oscillations are in the nature of accoustic waves producing alternately dense and rare ion groups which constitute a convection current at the ion oscillation frequency. In the region of a dense ion group the electron beam will be smaller in diameter since its own space charge effect is balanced by the denser positive ion group. However, in a region where positive ions are less dense the electron beam will be larger in cross section. Hence, a modulation of the electron beam coupling coefficient is effected by these ion osccillations at the plasma ion frequency.

The orders of magnitude of some of the quantities involved in ion oscillations may be shown by a few relatively simple calculations. However, since a partial plasma is also believed to be capable of supporting oscillations, these figures should not be considered as at all inclusive or exclusive.

Assuming, by way of an example, a beam current density of 100 milliamperes per square centimeter and a beam accelerating voltage of 1600 volts, the electron velocity will be $$v = \sqrt{\frac{2eV}{m_e}}$$

and the number density of electrons will be $$n_e = e\frac{I_e}{\sqrt{\frac{2eV}{m_e}}}$$

or approximately $3 \times 10^8$ electrons per cubic centimeter. In these relations, $v$ is the electron velocity in centimeters per second, $e$ is the electron charge in coulombs, $V$ is the electron accelerating voltage in volts, $m_e$ is the electronic mass in grams, $n_e$ is the density of electrons in electrons per cubic centimeter, and $I_e$ is the beam current density in amperes per square centimeter.

The molecular density is given by the relation $$n_m = \frac{P}{T}$$

where $n_m$ is the molecular density in gas molecules per cubic centimeter, P is the gas pressure in grams force per square centimeter, and T is the gas temperature in degrees Kelvin.

Assuming, for example, the average gas pressure at 300 degrees Kelvin to be that corresponding to a manometer reading $10^{-8}$ millimeters of mercury, then $n_m$ is approximately equal to $3 \times 10^8$ molecules per cubic centimeter. If all molecules become ionized the plasma ion frequency would be approximately equal to $2.5 \times 10^6$ cycles per second.

In practical traveling-wave amplifiers, it is generally desirable to reduce these spurious ion oscillations. As has been heretofore indicated, ion noise has the effect of reducing the signal-to-noise modulation ratio of the tube and of distorting the electromagnetic wave as it is being amplified.

Spurious ion oscillations may be reduced in a number of ways. For instance, the tube may be designed and processed to reduce the potential number of ions by reducing the gas pressure within the tube and maintaining it at a low value. This may be done in the structures shown in Figs. 1, 2, 3, and 4 by the use of a unitary helix assembly which can be vacuum preglowed as well as glowed during the pumping of the tube. In addition, a tantalum or zirconium collector which can be preglowed at a very high temperature as well as during the pumping of the tube can be used. Such a collector serves to absorb gas molecules during operation of the tube if it is designed to run at a suitably elevated temperature. Gas pressure within the tube can be further reduced by coating other hot members of the tube with zirconium to collect gas molecules while the tube is being operated. Finally, the ion shield which, in accordance with the present invention, is employed to sweep any ions that do exist out of the electron path may be coated with zirconium or some other suitable gas absorbing material.

Spurious ion oscillations may also be reduced by designing the electron gun and the magnetic focusing system so that no beam "cross-overs" exist and so that there is secured uniform beam current density which is as low as possible consistent with other requirements. This method of noise reduction is exemplified by the use of the triode-type of signal input circuit shown in Figs. 1 and 3.

Finally, in accordance with the present invention, ion noise may be reduced by providing a direct-current field which has strong radial components to sweep ions away from the beam to a gas absorbing electrode which has an area large enough so that the rate of ion removal exceeds the rate of ion production by a large margin during the life of the tube. As previously stated, the present invention contemplates the use of a cylindrical electrode surrounding the helix which is maintained at a potential substantially positive with respect to the helix or a metal envelope maintained at a potential which may be either substantially positive or substantially negative with respect to the helix.

Figs. 6A, 6B, 6C, and 6D all show curves of potential distribution within traveling-wave tubes embodying the present invention for various ion shield potentials. The potential distribution curves are superimposed upon diagrams showing the relative positions of the electron beam, the helix, and the ion shield or envelope. The solid curves $V(r)$ show the potential distribution along the radius of the tube between helix wires, while the dashed curves $V(r)$ represent the potential distribution through helix wires. In all figures, potentials are shown with the helix potential as the reference.

Referring particularly to Fig. 6A, the radial potential distribution is shown for the case in which the ion collector is run at a direct-current potential sufficiently negative with respect to the helix to produce a strong outward gradient for ions between the helix wires. In the case shown, the ion collector electrode is sufficiently negative to remove practically all of the ions as soon as they are formed and the ions are collected on the large outer electrode which, in accordance with the present invention, is the metal envelope of the tube.

Fig. 6B illustrates the effects of the superimposed direct-current field when the ion collecting electrode is at the same direct-current potential as the helix. There is no ion collection in excess of that which is present due to diffusions in the plasma equilibrium condition. It is of interest to note that the beam cross-section is uniform and that the coupling between the beam and the radio frequency field is similarly uniform.

Fig. 6C illustrates the situation when the ion collecting electrode is highly negative with respect to the helix and is collecting ions to itself. The situation is substantially the same as that described in connection with Fig. 6A, except that here further effects are shown. Since the ions are collected between helix wires the electron beam diameter will vary as shown in Fig. 6C. Since the beam diameter is less between helix wires than through helix wires, the coupling to the radio frequency field has been somewhat reduced from what it would be in the absence of the ion removal means.

As has been previously indicated, the outer ion collector shown in Fig. 6C corresponds to metal envelope 61 in Figs. 3 and 4 when it is maintained at a potential substantially negative with respect to the helix. The radial direct-current field removes noise producing positive ions faster than they are formed. In addition, it will be noted that between helix wires the potential gradient tends to prevent the electron beam from spreading. This feature of the present invention, in other words, not only serves to reduce spurious ion oscillations but also serves to confine the electrons to the beam area and prevent undue loss of energy by electrons striking the helix. A cylindrical outer ion electrode, situated within a glass envelope, which is negative with respect to the helix is shown in application Serial No. 64,669, filed December 10, 1948, by J. R. Pierce.

Fig. 6D illustrates conditions existing when the ion shield is run at a potential highly positive with respect to the helix. As seen from Fig. 6D, the ions are collected by the helix and the electron beam diameter is modified in the opposite sense from that shown in Fig. 6C. The beam diameter is less in cross-sections taken through helix wires than it is between helix wires, and the coupling to the radio frequency field is increased from what it would be in the absence of the ion removal means.

The outer ion collector shown in Fig. 6D corresponds to shield 29 in Fig. 1, shield 54 in Fig. 2, and metal envelope 61 in Figs. 3 and 4 when it is maintained at a potential substantially positive with respect to the helix. The direct-current field sweeps positive ions onto the helix wires faster than they are formed. As with the field shown in Fig. 6C, the radial field shown in Fig. 6D has the effect of tending to confine the electrons to the beam, the potential gradient at cross sections of the tube through helix wires being such that electrons tend to be forced inward to the tube axis. Thus, this embodiment of the present invention also performs the dual role of reducing random ion oscillations and of helping to focus the electron stream. It has, in addition, the advantage of tending to increase the coupling between the electron beam and the radio frequency field and thereby increasing radio frequency gain.

Actual tests of the several embodiments of the present invention have shown that the predicted effects take place. In cases where the ion collector was operated at cathode potential, the radio frequency gain fell off about two decibels and the ion noise modulation was reduced by thirty to fifty decibels. Similar reductions in ion modulation were observed for the case of the ion electrode being operated positively, with a slight increase of about one decibel in the radio frequency gain.

Certain other traveling-wave tube ion electrode arrangements are of interest by way of comparison with the various embodiments of the present invention. Figs. 7A, 7B, 8A, 8B, 9A and 9B all show potential distribution curves superimposed upon diagrams showing the relative positions of helices, ion sweeping electrodes, and tubular electron beams. All of the arrangements shown provide direct-current electric fields which have strong radial components.

Figs. 7A and 7B show an ion removal arrangement of the type disclosed and claimed in application Serial No. 137,315, filed January 7, 1950, by A. V. Hollenberg. In that arrangement, a tubular electron beam is projected within a helix. Down the center of the tubular beam runs a fine wire electrode or a resistance coated ceramic rod which will serve as an ion sweeping or collecting electrode. In Fig. 7A, the radial potential distribution is shown when the central electrode is more negative than the helix and the ions are collected by the central wire. Fig. 7B shows the potential distribution when the central wire is more positive than the helix and the helix or the tube envelope collects the ions.

Figs. 8A and 8B show an ion removal system of the type shown in application Serial No. 64,669, filed December 10, 1948, by J. R. Pierce. A tubular electron beam is projected outside of a helix and an ion sweeping electrode surrounds the beam. In Fig. 8A, the radial potential distribution within the tube is shown when the outermost ion sweeping electrode is more negative than the helix and ions are collected by it. In Fig. 8B, the distribution is shown when the outermost electrode is more positive than the helix, in which case the helix collects the positive ions.

Figs. 9A and 9B show still another type of ion removal arrangement. A system of this general nature has also been shown in application Serial No. 64,669, filed December 10, 1948, by J. R. Pierce. In it, a tubular electron beam is projected between a pair of concentric helices which are held at substantially different direct-current potentials. In Figs. 9A and 9B the potentials of the helices are indicated by $V_{h1}$ and $V_{h2}$, respectively. In Fig. 9A, the inner helix is positive with respect to the outer helix and positive ions are collected by the outer helix, while, in Fig. 9B, the inner helix is negative with respect to the outer helix and it collects the ions.

It is to be understood that the arrangements which have been described are illustrative of the application of the principles of the present invention. Numerous other arrangements may be devised by those skilled in the art without departing from the spirit and scope of the invention.

What is claimed is:

1. A traveling-wave amplifier which comprises an electromagnetic wave transmission circuit in the form of an elongated conducting helix, an evacuated cylindrical envelope of substantially uniform internal diameter throughout most of its length coaxially disposed about said helix, said envelope including a conducting portion enclosing a major portion of the turns of said helix and a cylindrical dielectric portion permeable to the transmission of electromagnetic wave energy enclosing the end turns at one end of said helix, the interiors of said conducting portion and said dielectric portion constituting substantially a smooth continuous surface, an electron-emissive cathode and an electron collector electrode spaced apart within said envelope at opposite ends of said helix to define a path of travel for electrons between them, and a plurality of substantially parallel non-conducting rod-like members extending lengthwise of said helix and disposed between and in contact with said helix and said conducting portion of said envelope to align the turns of said helix accurately with said cathode and said collector electrode and to insulate said helix from said conducting portion of said envelope, said rod-like members extending also into said dielectric portion of said envelope to align the turns of said helix enclosed by said dielectric portion accurately with those enclosed by said conducting portion.

2. A traveling-wave amplifier which comprises an electromagnetic wave transmission circuit in the form of an elongated conducting helix, an evacuated cylindrical envelope of substantially uniform internal diameter throughout most of its length coaxially disposed about said helix, said envelope including, seriatim, a first conducting portion enclosing a major portion of the turns of said helix, a cylindrical dielectric portion permeable to the transmission of electromagnetic wave energy enclosing the end turns at one end of said helix, and a second conducting portion, the interiors of said first and second conducting portions and said dielectric portion constituting substantially a smooth continuous surface, an electron-emissive cathode and an electron collector electrode spaced apart within said envelope at opposite ends of said helix to define a path of travel for electrons between them, and a plurality of substantially parallel non-conducting rod-like members extending lengthwise of said helix and disposed between and in contact with said helix and said first conducting portion of said envelope to align the turns of said helix accurately with said cathode and said collector electrode and to insulate said helix from said first conducting portion of said envelope, said rod-like members extending also into said dielectric portion of said envelope to align the turns of said helix enclosed by said dielectric portion accurately with those enclosed by said first conducting portion.

3. A traveling-wave amplifier which comprises an electromagnetic wave transmission circuit in the form of an elongated conducting helix, an evacuated cylindrical envelope of substantially uniform internal diameter throughout most of its length coaxially disposed about said helix, said envelope including a first metal portion enclosing a major portion of the turns of said helix, a second metal portion, and a cylindrical dielectric portion permeable to the transmission of electromagnetic wave energy interposed and vacuum-sealed between said first and second metal portions, said dielectric portion of said envelope having substantially the same internal diameter as said first and second metal portions and enclosing the end turns at one end of said helix, an electron-emissive cathode and an electron collector electrode spaced apart within said envelope at opposite ends of said helix to define a path of travel for electrons between them, and a plurality of substantially parallel non-conducting rods extending lengthwise of said helix and disposed between and in contact with said helix and said first metal portion of said envelope to align the turns of said helix accurately with said cathode and said collector electrode and to insulate said helix from said first metal portion of said envelope, said rods extending also through said dielectric portion of said envelope to align the turns of said helix enclosed by said dielectric portion accurately with those enclosed by said first metal portion.

4. A traveling-wave amplifier in accordance with claim 3 which includes a hollow rectangular wave guide closed at one end and having a pair of transversely aligned apertures in opposite side walls, said envelope extending through said apertures with its axis substantially normal to the said opposite side walls of said wave guide and said dielectric section of said envelope being substantially completely within the interior of said wave guide.

5. A traveling-wave amplifier which comprises an electromagnetic wave transmission circuit in the form of an elongated conducting wire helix, an evacuated cylindrical envelope of substantially uniform internal diameter throughout most of its length coaxially disposed about said helix, said envelope including a first metal portion enclosing a major portion of the turns of said helix, a second metal portion, and a cylindrical dielectric portion permeable to the transmission of electromagnetic wave energy interposed and vacuum-sealed between said first and second metal portions, said dielectric portion of said envelope having substantially the same internal diameter as said first and second metal portions and enclosing the end turns at one end of said helix, an electron-emissive cathode and an electron collector electrode spaced apart within said envelope at opposite ends of said helix to define a path of travel for electrons between them, a plurality of substantially parallel non-conducting rods extending lengthwise of said helix and disposed between and in contact with said helix and said first metal portion of said envelope to align the turns of said helix accurately with said cathode and said collector electrode and to insulate said helix from said first metal portion of said envelope, said rods extending also into said dielectric portion of said envelope to align the turns of said helix enclosed by said dielectric portion accurately with those enclosed by said first metal portion, a hollow rectangular wave guide closed at one end and having a pair of transversely aligned apertures in opposite side walls, said envelope extending through said apertures with its axis substantially normal to the said opposite side walls of said wave guide, and said dielectric section of said envelope being substantially completely within the interior of said wave guide, and a direct-current connection between said helix and said first metal portion of said envelope at one end only of said helix, said direct-current connection including a source of direct potential to maintain said helix at a substantially different direct potential from said first metal portion of said envelope and reduce noise modulation by removing ions from the path of the electron stream as rapidly as they are formed.

6. In a microwave amplifier, an elongated electromagnetic wave transmission circuit, an evacuated envelope of substantially uniform internal cross-section throughout most of its length enclosing said wave transmission circuit, said envelope comprising a first hollow cylindrical metal section enclosing said wave transmission circuit throughout a major portion of its length, a second hollow cylindrical metal section, and a hollow cylindrical dielectric section enclosing one end of said wave transmission circuit interposed and vacuum-sealed between said first and second metal sections, said dielectric section having substantially the same internal cross-section as said first and second metal sections, the interiors of said first and second metal sections and said dielectric section constituting substantially a smooth continuous surface, and an electron-emissive cathode and an electron collector electrode spaced apart within said envelope at opposite ends of said wave transmission circuit to define a path of travel for electrons between them.

7. A traveling-wave amplifier which comprises an electromagnetic wave transmission circuit in the form of an elongated conducting helix, an evacuated cylindrical envelope of substantially uniform internal diameter throughout most of its length coaxially disposed about said helix, said envelope including, seriatim, a first conducting portion enclosing a major portion of the turns of said helix, a cylindrical dielectric portion permeable to the transmission of electromagnetic wave energy enclosing the end turns at one end of said helix, and a second conducting portion, an electron-emissive cathode and an electron collector electrode spaced apart within said envelope at opposite ends of said helix to define a path of travel for electrons between them, a plurality of substantially parallel non-conducting rod-like members extending lengthwise of said helix and disposed between and in contact with said helix and said first conducting portion of said envelope to align the turns of said helix accurately with said cathode and said collector electrode and to insulate said helix from said first conducting portion of said envelope, said rod-like members extending also into said dielectric portion of said envelope to align the turns of said helix enclosed by said dielectric portion accurately with those enclosed by said first conducting portion, and a direct-current connection between said helix and said first conducting portion of said envelope at one end only of said helix, said direct-current connection including a source of direct potential to maintain said helix at a substantially different direct potential from said first conducting portion of said envelope and reduce noise modulation by removing ions from the path of the electron stream as rapidly as they are formed.

References Cited in the file of this patent

UNITED STATES PATENTS

| Number | Name | Date |
|---|---|---|
| 2,064,469 | Haeff | Dec. 15, 1936 |
| 2,300,052 | Lindenblad | Oct. 27, 1942 |
| 2,306,195 | Szuba | Dec. 22, 1942 |
| 2,368,060 | Wooten | Jan. 23, 1945 |
| 2,541,843 | Tiley | Feb. 13, 1951 |
| 2,575,383 | Field | Nov. 20, 1951 |
| 2,578,434 | Lindenblad | Dec. 11, 1951 |
| 2,585,582 | Pierce | Feb. 12, 1952 |
| 2,611,102 | Bohlke | Sept. 10, 1952 |